(12) United States Patent
Gassoway

(10) Patent No.: US 8,407,792 B2
(45) Date of Patent: Mar. 26, 2013

(54) SYSTEMS AND METHODS FOR COMPUTER SECURITY

(75) Inventor: Paul Gassoway, Norwood, MA (US)

(73) Assignee: CA, Inc., Islandia, NY (US)

( * ) Notice: Subject to any disclaimer, the term of this patent is extended or adjusted under 35 U.S.C. 154(b) by 1500 days.

(21) Appl. No.: 10/849,633

(22) Filed: May 19, 2004

(65) Prior Publication Data

US 2005/0262566 A1 Nov. 24, 2005

(51) Int. Cl.
*H04L 29/06* (2006.01)
(52) U.S. Cl. ............................................. 726/24; 726/23
(58) Field of Classification Search .................... 713/38, 713/188; 726/23, 24
See application file for complete search history.

(56) References Cited

U.S. PATENT DOCUMENTS

| | | | | |
|---|---|---|---|---|
| 5,623,600 A * | 4/1997 | Ji et al. | | 726/24 |
| 5,842,002 A * | 11/1998 | Schnurer et al. | | 703/21 |
| 5,948,104 A * | 9/1999 | Gluck et al. | | 726/24 |
| 6,131,163 A | 10/2000 | Wiegel | | 713/201 |
| 6,301,668 B1 | 10/2001 | Gleichauf et al. | | |
| 6,370,648 B1 | 4/2002 | Diep | | 713/201 |
| 6,557,920 B1 * | 5/2003 | Hobson et al. | | 296/97.1 |
| 7,017,186 B2 | 3/2006 | Day | | |
| 7,065,482 B2 | 6/2006 | Shorey et al. | | 703/224 |
| 7,080,000 B1 * | 7/2006 | Cambridge | | 703/21 |
| 7,287,278 B2 | 10/2007 | Liang | | 726/22 |
| 7,343,624 B1 | 3/2008 | Rihn et al. | | |
| 7,359,930 B2 | 4/2008 | Jackson et al. | | 709/200 |
| 7,409,714 B2 | 8/2008 | Gupta et al. | | |
| 7,434,297 B1 | 10/2008 | Sutton et al. | | 26/24 |
| 7,512,808 B2 | 3/2009 | Liang | | 713/188 |
| 7,565,692 B1 | 7/2009 | Maria | | 726/23 |
| 2002/0147780 A1 * | 10/2002 | Liu et al. | | 709/206 |
| 2002/0166063 A1 | 11/2002 | Lachman et al. | | |
| 2003/0110396 A1 | 6/2003 | Lewis et al. | | |
| 2003/0145225 A1 | 7/2003 | Bruton, III et al. | | |
| 2003/0159070 A1 | 8/2003 | Mayer et al. | | |
| 2003/0172292 A1 * | 9/2003 | Judge | | 713/200 |
| 2003/0196095 A1 | 10/2003 | Jeffries et al. | | |
| 2003/0204619 A1 | 10/2003 | Bays | | 709/238 |
| 2003/0212913 A1 * | 11/2003 | Vella | | 713/202 |
| 2004/0047356 A1 | 3/2004 | Bauer | | |
| 2004/0181664 A1 | 9/2004 | Hoefelmeyer et al. | | |
| 2005/0108393 A1 | 5/2005 | Banerjee et al. | | 709/225 |
| 2005/0251854 A1 | 11/2005 | Shay | | 726/2 |
| 2005/0265331 A1 | 12/2005 | Stolfo | | |

FOREIGN PATENT DOCUMENTS

GB 2 362 076 A 11/2001
WO WO 02/23805 A2 3/2002

(Continued)

OTHER PUBLICATIONS

Notification of Transmittal of the International Search Report and the Written Opinion of the International Searching Authority of International application No. PCT/US2005/017443, filed May 18, 2005 (11 pages), Aug. 24, 2005.

(Continued)

*Primary Examiner* — Edward Zee
(74) *Attorney, Agent, or Firm* — Baker Botts, L.L.P.

(57) ABSTRACT

A method for maintaining computer security comprises receiving an incoming email destined for an email server, determining whether the received incoming email is infected with malicious code and blocking the incoming email determined to be infected with malicious code from reaching the email server.

26 Claims, 8 Drawing Sheets

FOREIGN PATENT DOCUMENTS

| | | |
|---|---|---|
| WO | WO 02/37755 A2 | 5/2002 |
| WO | WO 03/055148 A1 | 7/2003 |
| WO | WO 03/090426 A1 | 10/2003 |

OTHER PUBLICATIONS

Notification of Transmittal of International Search Report and Written Opinion; PCT/US2005/017446; 7 pages, Sep. 15, 2006.

Notification of Transmittal of International Search Report and Written Opinion; Application No. PCT/US2005/017601, 7 pages, Sep. 14, 2005.

Apap, et al., "Detecting Malicious Software by Monitoring Anomalous Windows Registry Accesses", Springer-Verlag Berlin, Heidelberg 2002; RAID 2002, LNCS 2516, pp. 36-53, 2002.

USPTO; Office Action for U.S. Appl. No. 11/133,962 (14 pages), Oct. 16, 2008.

USPTO, Office Action, U.S. Appl. No. 11/132,611 dated Mar. 23, 2009.

Ahmed, et al.; *TCP/IP Protocol Stack Analysis Using MENet*; 0-7803-7651-X/03; pp. 1329-1333, 2003.

USPTO; Office Action for U.S. Appl. No. 11/133,962 in the name of Paul Gassoway; 16 pages, Oct. 19, 2009.

USPTO; Office Action for U.S. Appl. No. 11/133,962 in the name of Paul Gassoway; 15 pages, Feb. 4, 2010.

USPTO; Office Action for U.S. Appl. No. 11/133,962 in the name of Paul Gassoway; 23 pages, Jul. 22, 2010.

USPTO; Office Action for U.S. Appl. No. 11/133,962 in the name of Paul Gassoway; 19 pages, Dec. 8, 2010.

\* cited by examiner

SYSTEMS AND METHODS FOR COMPUTER SECURITY

BACKGROUND

1. Technical Field

The present disclosure relates to security and, more particularly, to methods and systems for computer security.

2. Description of the Related Art

With the growth of the Internet, the increased use of computer systems and the exchange of information between individual users pose a threat to the security of computers. Computer security attempts to ensure the reliable operation of networking and computing resources and attempts to protect information on the computer or network from unauthorized access or disclosure. Computer system(s) as referred to herein may include(s) individual computers, servers, computing resources, networks, etc. Among the various security threats that present increasingly difficult challenges to the secure operation of computer systems are hypertext transfer protocol (HTTP) attacks, computer viruses, worms, Trojan horses, etc. HTTP attacks are often targeted at exploiting known web site vulnerabilities by manipulating application behavior for malicious purposes. Computer viruses are programs that can infect other programs by modifying them in such a way as to include a copy of themselves. Unlike computer viruses, worms do not need to infect other programs. Worms are independent programs that are capable of reproducing themselves, spreading from machine to machine across network connections.

These threats prey on system vulnerabilities and have proven themselves to be extremely destructive, often times altering databases, destroying electronic files, and even disabling the computer network itself.

System administrators responsible for the efficient day to day operation of computer networks may use many different techniques to protect the system from such attacks. Those techniques may include installing firewalls, utilizing virus checking software to detect viruses, and employing patching software to counteract contracted viruses.

A firewall is basically a separate computer system and/or software system composed of a set of related programs that is placed between a private computer system and a public network (i.e., Internet). A firewall provides security protection to the system by screening incoming requests and preventing unauthorized access. Firewalls operate by working with router programs to determine the next destination to send information packets, ultimately deciding whether or not to forward the packets to that location. Firewalls can also impose internal security measures on users in the system by preventing them from accessing certain materials, such as websites on the World Wide Web, that may have unknown and potentially dangerous security consequences.

Proxy servers, often associated with firewalls, are programs that act as intermediaries between web servers and web browsers. More specifically, proxy servers forward requests from users in the private network through the firewalls to Internet services, retrieve the requested information, and return it to the web server. Reverse proxy servers work like normal proxies; however, they operate in the reverse. That is, they forward requests from the Internet often through a firewall to the private network's server(s) and other hardware, retrieve the requested information, and return it to the Internet user.

Virus checking software operates to protect the network from the spread of viruses by detecting the virus and isolating or removing the viral code. Virus checking software may be employed in each computer connected to the network (through the desktop) and/or at the server level (through a firewall). Virus checking software may contain a list of previously defined virus signatures, containing binary patterns, each associated with a virus. The system scans the various files of the system looking for a match to a particular virus signature. If a virus is detected, the user is notified and further steps may be taken to rid the system of the malicious code. The problem with anti-virus programs is that they should be continuously updated to be able to detect new and modified viruses. This not only proves to be a very tedious and time consuming task for very large networks that have hundreds of users, but even for small networks and individual computer users, it may not happen often enough to provide adequate safeguards against foreign intrusions. Furthermore, although the anti-virus software may detect viruses present in the system, it does nothing to prevent them from infiltrating the system in the first place.

Patching is the process by which security holes and system vulnerabilities are closed through the application of a "patch", updated software code that is used to address bugs. However, in large companies, to ensure that the application of a patch will be feasible, system administrators are forced to comply with specific procedures before applying patches, for example, to ensure that the patch will do no further damage to the system. These procedures often take time and increase the chances that an exploit will be able to compromise the organization's web servers before the patch is even applied. In addition, a more prevalent problem with patches is that system administrators of large and small companies alike, need to continuously monitor appropriate information sources to be aware of new patches. Thus, administrators are burdened with continuously keeping up to date to minimize the chance of security breaches.

An example of an email system is shown in FIG. 2. The system includes an email server 21 and clients 24 which may or may not be on a same network. Email destined for clients 24 is received from the Internet 26 and stored in email server 21. Clients 24 can then access their email by, for example, sending a request to email server 21.

The use of malicious email to spread viruses has grown along with the growth of the internet. An email attack may be carried out by including malicious code in the body of the email message itself or in any attachments to the email. For example, email viruses exist in which malicious code is included in the email message or in the attachments to the email. When the email or attachment is opened, the malicious code is downloaded to the user's computer system. The malicious code may then email copies of itself to other systems utilizing addresses located in email address books found on the user's computer system. These are examples of the types of attack which can be addressed by the present disclosure.

Accordingly, it would be beneficial to provide a method and system for preventing security breaches and ensuring that exploitation of system vulnerabilities will not come to light.

SUMMARY

A method, system and computer recording medium for maintaining computer security comprise receiving an incoming email destined for an email server, determining whether the received incoming email is infected with malicious code and blocking the incoming email determined to be infected with malicious code from reaching the email server.

A method, system and computer recording medium for maintaining computer security comprise receiving an email from an email server destined for an end user, determining whether the received email is infected with malicious code and blocking the received email determined to be infected with malicious code from reaching the end user.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DETAILED DESCRIPTION

Figure 1:
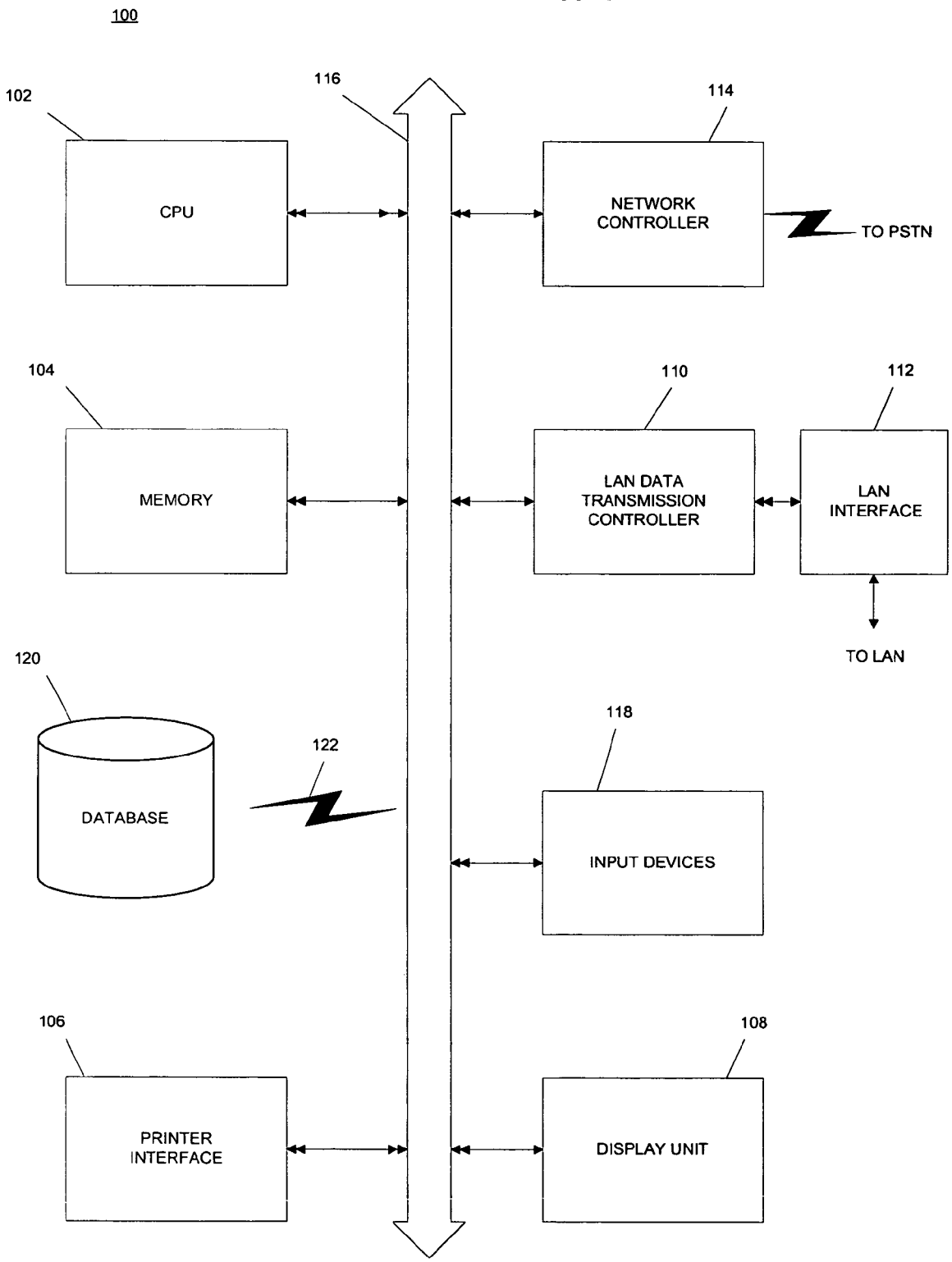
FIG. 1 illustrates an example of a computer system capable of implementing the systems and methods of the present disclosure.
Figure 2:
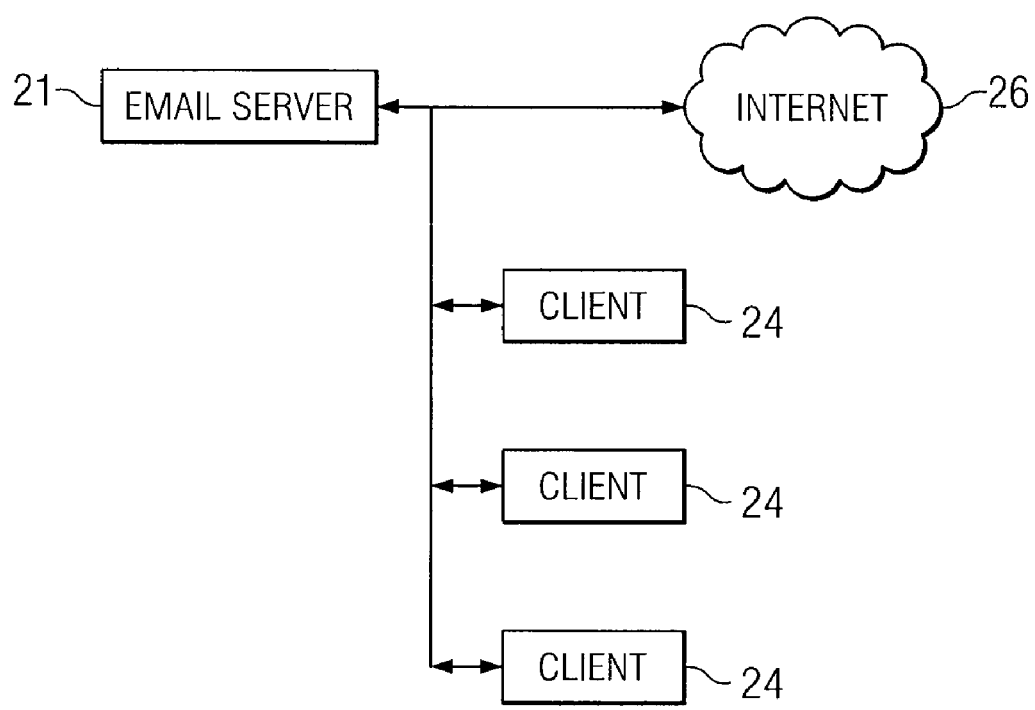
FIG. 2 is a block diagram illustrating a background email server system.

In describing preferred embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

FIG. 1 shows an example of a computer system which may implement the method and system of the present disclosure. The system and method of the present disclosure may be implemented in the form of a software application running on a computer system, for example, a mainframe, personal computer (PC), handheld computer, server, etc. The software application may be stored on a recording media locally accessible by the computer system, for example, floppy disk, compact disk, hard disk, etc., or may be remote from the computer system and accessible via a hard wired or wireless connection to a network, for example, a local area network, or the Internet.

The computer system referred to generally as system 100 may include a central processing unit (CPU) 102, for example, Random Access Memory (RAM), a printer interface 106, a display unit 108, a (LAN) local area network data transmission controller 110, a LAN interface 112, a network controller 114, an internal bus 116, and one or more input devices 118, for example, a keyboard, mouse etc. As shown, the system 100 may be connected to a data storage device, for example, a hard disk, 120, via a link 122.

Figure 3:
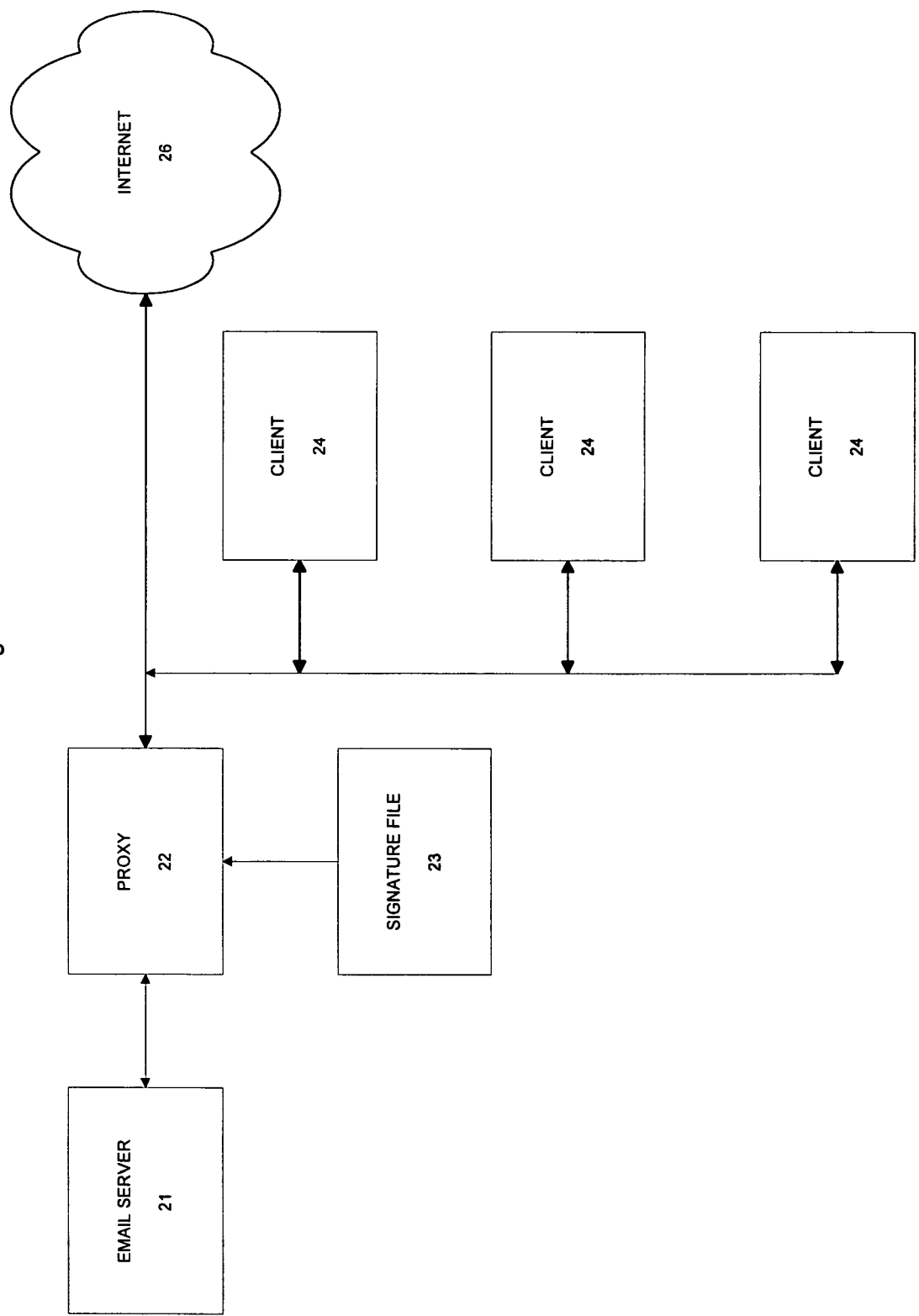
FIG. 3 is a block diagram of an email server system according to an embodiment of the present disclosure.

A system for maintaining computer security according to an embodiment of the present disclosure is described with reference to FIG. 3. Proxy machine 22 provides an interface between email server 21 and clients 24 and the Internet 26. For example, proxy 22 may be in the form of a firewall or computer hardware system and/or software system that interfaces with email server 21. Clients 24 may or may not be on a same network. The domain name service (DNS) entry for email server 21 points to proxy machine 22. One or more signature files 23 may be provided which contain information about known vulnerabilities and exploits that may be used against email server 21. This information is made available to proxy machine 22. Email going to and coming from email server 21 passes through proxy machine 22.

When used in conjunction with signature file 23, proxy machine 22 works to protect email server 21 from malicious attacks. When email is received, for example, from a computer on Internet 26 or a client 24, it is first directed to proxy machine 22. Proxy machine 22 then determines whether the received email is malicious. If proxy machine 22 determines that the email is in fact malicious, proxy machine 22 blocks the email from reaching email server 21, thereby preventing it from ever exploiting email server 21. On the other hand, if proxy machine 22 determines that the email is not malicious, it will forward it to email server 21.

Figure 4:
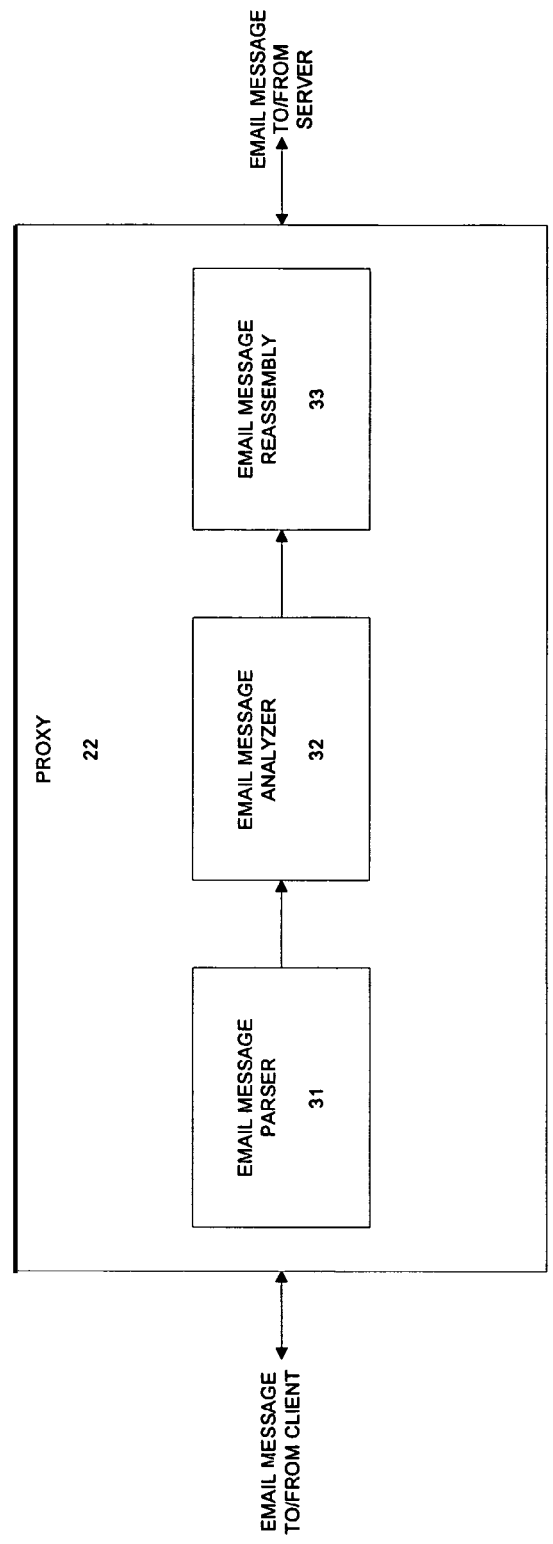
FIG. 4 is a block diagram illustrating the basic architecture of a proxy according to an embodiment of the present disclosure.
Figure 5:
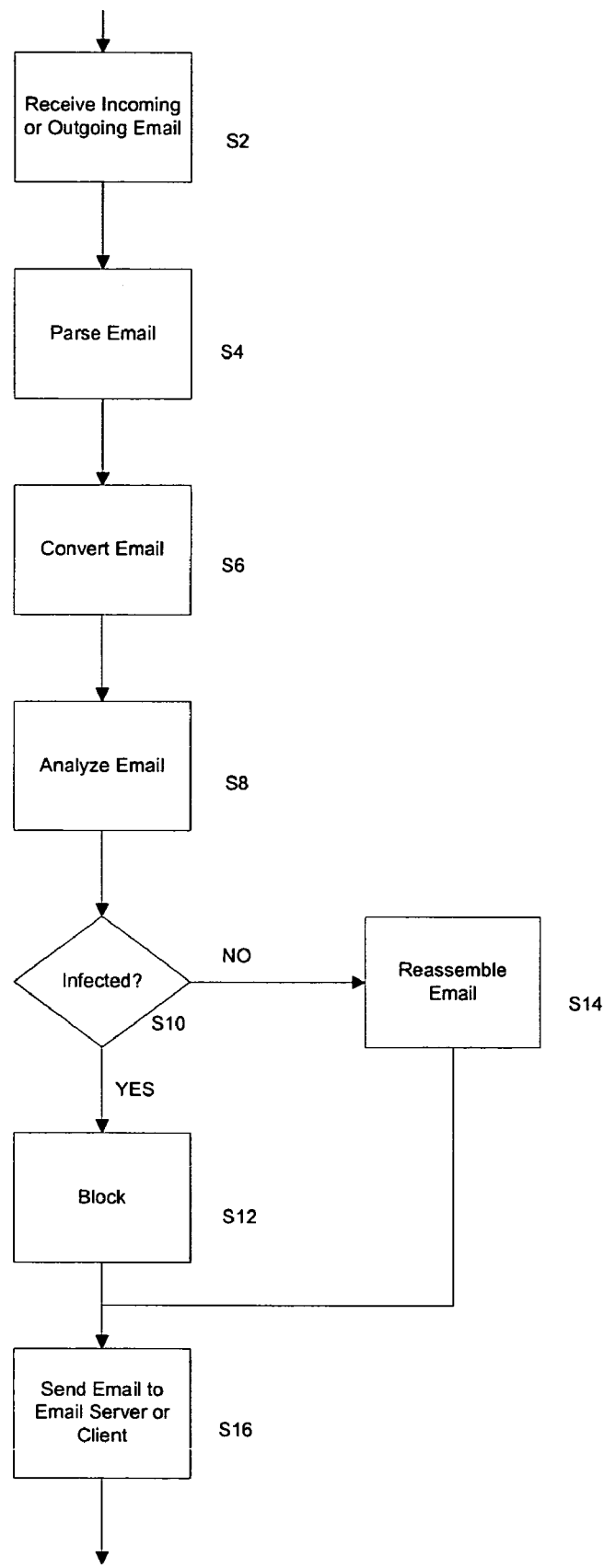
FIG. 5 is a flow chart for describing operation of the proxy machine according to an embodiment of the present disclosure.

FIG. 4 illustrates the basic architecture of proxy machine 22 and FIG. 5 is a flow chart for explaining the operation of proxy machine 22 according to embodiments of the present disclosure. As noted above, incoming email from systems on the Internet 26 and clients 24 first pass through proxy server 22. According to an embodiment of the present disclosure as shown in FIG. 4, proxy 22 is composed of an email message parser module 31, an email message analyzer module 32 and an email message reassembly module 33.

The email message parser module 31 receives incoming email (Step S2), parses the incoming email (Step S4) and converts it into an internal structure that email message analyzer module 32 recognizes (Step S6). The data in the internal structure is then passed to email message analyzer 32 where it is examined looking for any suspicious malicious code (Step S8). For example, the email message itself could be scanned using intrusion detection signatures to determine if the email message would exploit any vulnerabilities of email server 21. Any attachments to the email could also be scanned through an anti-virus system of signatures to determine if the attachment is infected with malicious code. If email message analyzer module 32 determines that the attachment is infected (YES, Step S10), the attachment can be blocked and the email may be modified to indicate to the end recipient that an attachment to the email was blocked (Step S12). The email (minus the attachment) can then be sent on to email server 21 (Step S16). A return email can also be forwarded to the sender of the email informing them that the attachment was blocked. In the alternative, if it is determined that the attachment is infected, the email and the attachment can be blocked. In this case, a return email can be prepared and forwarded to the sender (and recipient if desired) of the email indicating that the entire email was blocked. In this way, the malicious attachment to the email can be blocked from ever reaching email server 21. If the body of the email message itself were infected with malicious code that could exploit email server 21, the entire message could be blocked. If desired, an email could be automatically generated and sent to the sender and/or the intended recipient, informing them that the entire email has been blocked. If nothing malicious is found in the attachment or in the email message itself (NO, Step S10), the email is reassembled into its original format including any attachments, by email message reassembly module 33 (Step S14) and is then sent to email server 21 (Step S16).

Email messages being retrieved from email server 21 by a client 24 may also be screened by proxy machine 22. It is possible that some type of malicious code reached the email server 21 because the malicious code is more recent than the signature files being used by proxy machine 22. Accordingly, once the signature files 23 have been updated, any malicious code in the email (the email message or attachment) that may have reached email server 21 can be prevented from spreading since email proxy 22 will now detect the malicious code and block the email and/or the attachment. If the email and/or attachment is blocked, a notification can be forwarded to the recipient and sender of the email informing them of such.

Figure 6:
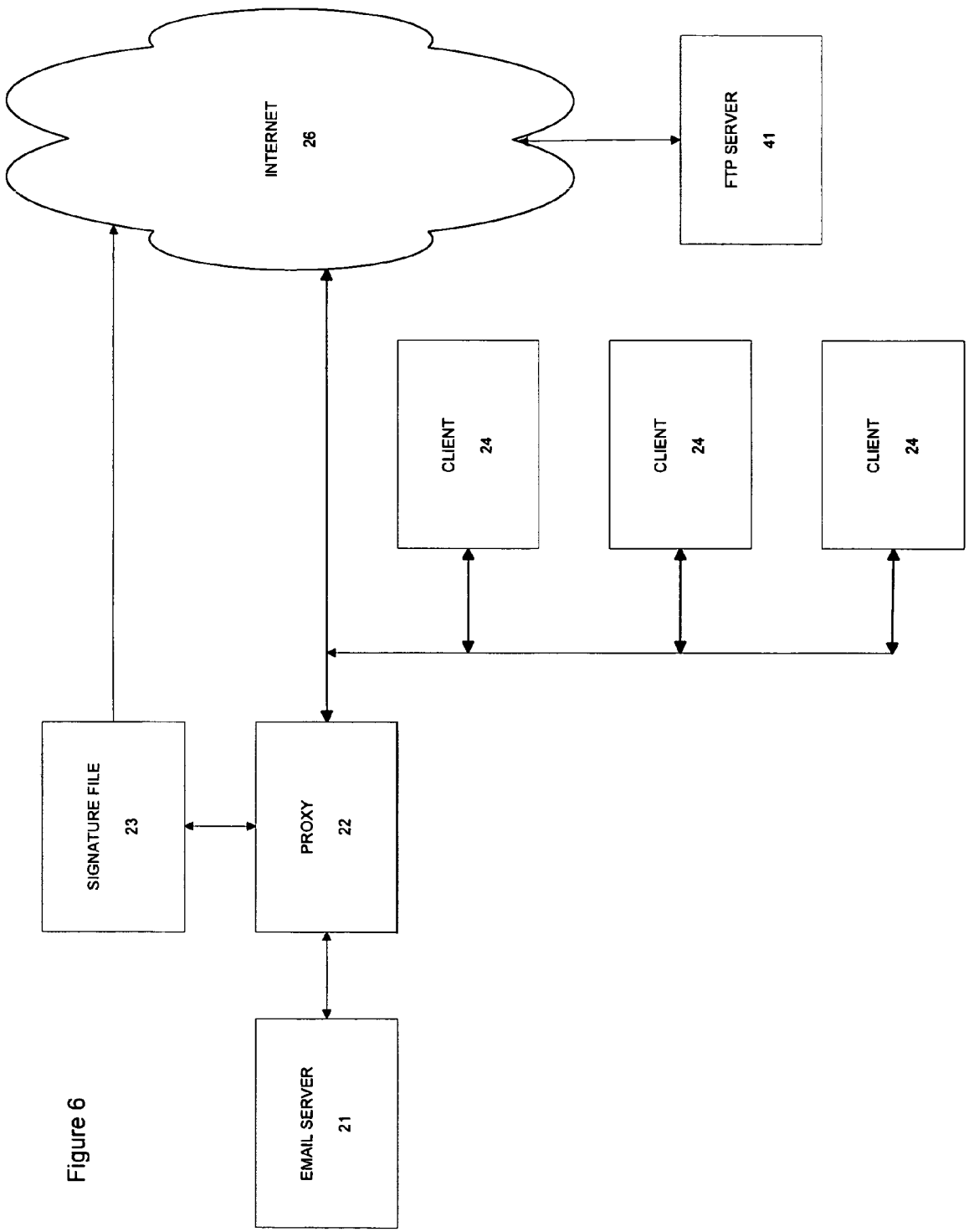
FIG. 6 is a block diagram illustrating the relationship between a proxy machine and a signature file according to an embodiment of the present disclosure.

The relationship between proxy machine 22 and signature file 23 according to an embodiment of the present disclosure is described with reference to FIG. 6. According to this embodiment of the present disclosure, signature file 23 is periodically updated to protect against the most up to date attacks. To do so, signature file 23 periodically accesses FTP Server 41 via the Internet 26 and downloads the latest versions of signature files.

Figure 7:
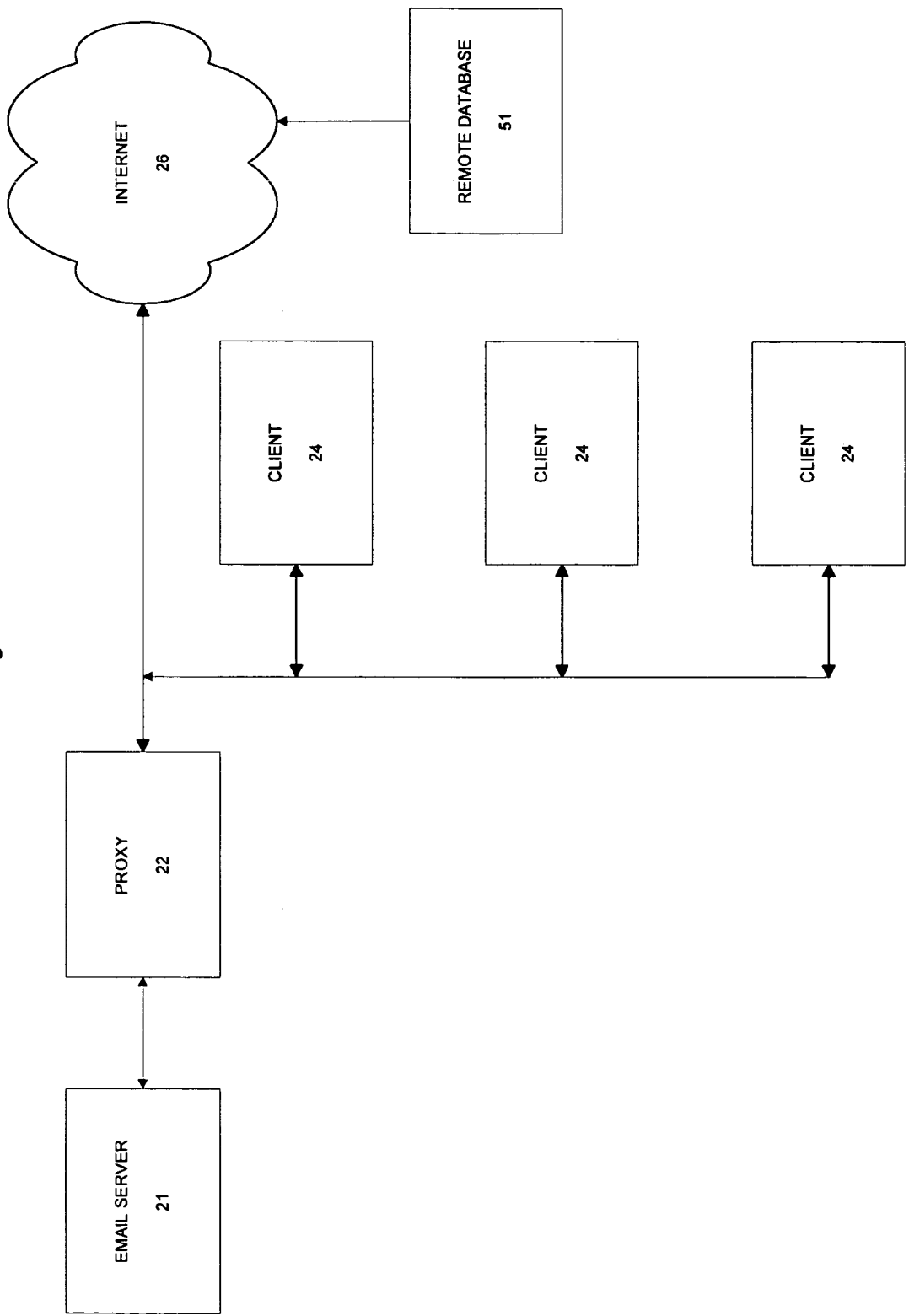
FIG. 7 is a block diagram illustrating the relationship between a proxy and a remote database according to an embodiment of the present disclosure.
Figure 8:
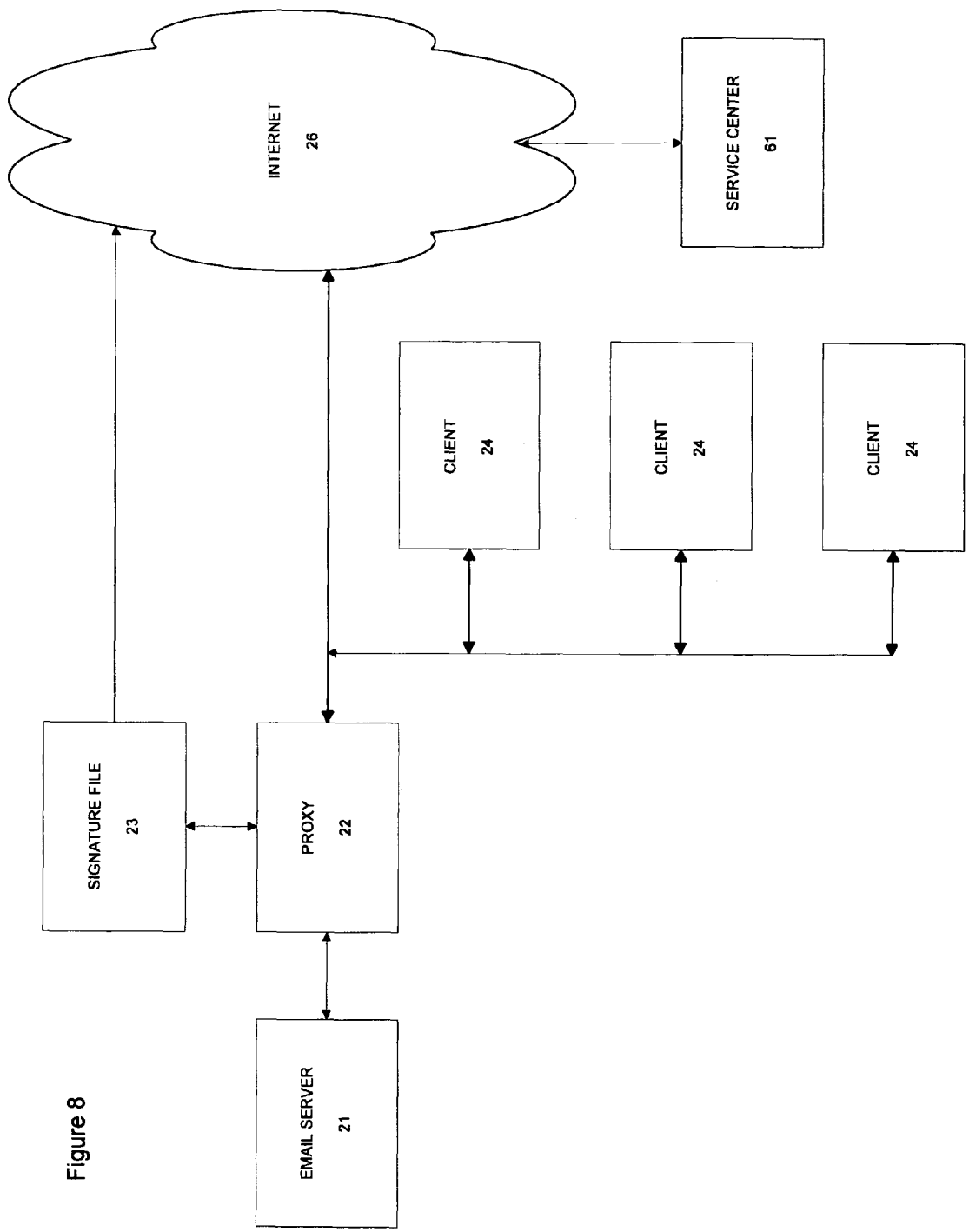
FIG. 8 is a block diagram illustrating the relationship between a proxy machine and a service center according to an embodiment of the present disclosure.

According to another embodiment, as shown in FIG. 7, instead of proxy 22 getting information from signature file 23, proxy machine 22 queries a remote database 51 via Internet 26 for matching signatures. According to yet another embodiment, as shown in FIG. 8, a service center 61 automatically sends updated signature files to signature file 23 via Internet 26 periodically or whenever a new attack is discovered.

Email message parser 31 and email message reassembly 33 (FIG. 4) may include one or more libraries having standard interfaces. There may be a separate library for each email protocol supported by proxy 22. Examples of email protocols that may be supported include Simple Mail Transfer Protocol (SMTP), Exchange, Notes, etc. The library to be used may be determined when the proxy is installed. Parser 31 is capable of converting email into an internal structure that would encompass the capabilities of each protocol that the proxy supported.

Email systems that include some form of security such as, for example, authentication between client and server, may also be supported. For example, the client may forward a message to proxy 22 to perform authentication. The message may then be forwarded to email server 21 so that it appeared to email server 21 that proxy 22 was logging on as the same user as the client. If an encryption system is used, proxy 22 can negotiate a key with client 24 and then negotiate a separate key with email server 21.

The present method and system thus provides an efficient and convenient way to protect a computer system from malicious attacks.

Numerous additional modifications and variations of the present disclosure are possible in view of the above-teachings. It is therefore to be understood that within the scope of the appended claims, the present disclosure may be practiced other than as specifically described herein.

What is claimed is:

1. A method for maintaining computer security comprising:
   receiving, at a proxy server, an email directed from an email server to an email client associated with the email server;
   scanning an email message included in the received email using intrusion detection signatures to determine if the email message would exploit a vulnerability associated with the email server;
   determining whether an attachment included in the received email is infected with malicious code; by
      parsing the received email;
      converting the received email into an internal format; and
      determining, at the proxy server, whether the converted received email includes malicious code using a virus signature file; and
   based on a determination that the attachment is infected:
      removing the attachment from the received email;
      modifying the received email, the modification indicating that the attachment was removed; and
      sending the modified email to the email client.

2. The method of claim 1, further comprising reassembling the converted email back into its original format if it is determined that the received email does not include malicious code.

3. The method of claim 2, wherein sending the modified email comprises sending the reassembled email to the email client.

4. The method of claim 1, wherein the virus signature file contains information about known email viruses.

5. The method of claim 1, wherein the virus signature file contains information about known viruses for email attachments.

6. The method of claim 1, further comprising continuously updating the virus signature file.

7. The method of claim 1, further comprising periodically downloading an updated virus signature file in order to make its copy current.

8. The method of claim 1, wherein the received email is parsed based on a protocol of the email, wherein the proxy server supports the protocol.

9. The method of claim 2, wherein the converted email is reassembled based on a protocol of the email, wherein the proxy server supports the protocol.

10. The method of claim 1, further comprising sending a notification to the sender of the received email and the receiver of the received email, the notification indicating that the attachment is infected with malicious code.

11. A computer system for maintaining computer security comprising:
   one or more computers configured to store computer code executable by the one or more computers, the computer code configured to:
      receive, at a proxy server, an email directed from an email server to an email client associated with the email server;
      scan an email message included in the received email using intrusion detection signatures to determine if the email message would exploit a vulnerability associated with the email server;
      determine whether an attachment included in the received email is infected with malicious code; and
      based on a determination that the attachment is infected:
         remove the attachment from the received email;
         modify the received email, the modification indicating that the attachment was removed; and
         send the modified email to the email client;
      wherein the computer code is further configured to determine whether an attachment included in the received email is infected with malicious code by:
         parsing the received email;
         converting the received email into an internal format; and
         determining, at the proxy server, whether the converted received email includes malicious code using a virus signature file.

12. The computer system of claim 11, wherein the computer code is further configured to reassemble the converted email back into its original format if it is determined that the received email does not include malicious code.

13. The computer system of claim 12, wherein the computer code is configured to send the modified email to the client by sending the reassembled email to the client.

14. The computer system of claim 11, wherein the virus signature file contains information about known email viruses.

15. The computer system of claim 11, wherein the virus signature file contains information about known viruses for email attachments.

16. The computer system of claim 11, wherein the computer code is further configured to continuously update the virus signature file.

17. The computer system of claim 11, wherein the computer code is further configured to periodically download an updated virus signature file in order to make its copy current.

18. A computer system for maintaining computer security comprising:
one or more computers configured to store computer code executable by the one or more computers, the computer code configured to:
receive, at a proxy server, an email directed from an email server to an email client associated with the email server;
scan an email message included in the received email using intrusion detection signatures to determine if the email message would exploit a vulnerability associated with the email server;
determine whether an attachment included in the received email is infected with malicious code by:
parsing the received email;
converting the received email into an internal format; and
determining, at the proxy server, whether the converted received email includes malicious code using a virus signature file; and
based on a determination where the attachment is infected:
remove the attachment from the received email;
modify the received email, the modification indicating that the attachment was removed; and
send the modified email to the email client.

19. The computer system of claim 18, wherein the computer code is further configured to reassemble the converted email.

20. A non-transitory computer storage medium including computer executable code for maintaining computer security, wherein the code is configured to:
receive, at a proxy server, an email directed from an email server to an email client associated with the email server;
scan an email message included in the received email using intrusion detection signatures to determine if the email message would exploit a vulnerability associated with the email server;
determine whether an attachment included in the received email is infected with malicious code by:
parsing the received email;
converting the received email into an internal format; and
determining, at the proxy server, whether the converted received email includes malicious code using a virus signature file; and
based on a determination that the attachment is infected:
remove the attachment from the received email;
modify the received email, the modification indicating that the attachment was removed; and
send the modified email to the email client.

21. The computer storage medium of claim 20, wherein the code is further configured to reassemble the converted email back into its original format if it is determined that the received email does not include malicious code.

22. The computer storage medium of claim 21, wherein the code is configured to send the modified email to the client by sending the reassembled email to the email client.

23. The computer storage medium of claim 20, wherein the virus signature file contains information about known email viruses.

24. The computer storage medium of claim 20, wherein the virus signature file contains information about known viruses for email attachments.

25. The computer storage medium of claim 20, wherein the code is configured to continuously update the virus signature file.

26. The computer storage medium of claim 20, wherein the code is configured to periodically download an updated virus signature file in order to make its copy current.

* * * * *